Jan. 1, 1924
F. W. CONKLIN
BEATER AND MIXER
Filed May 9, 1923
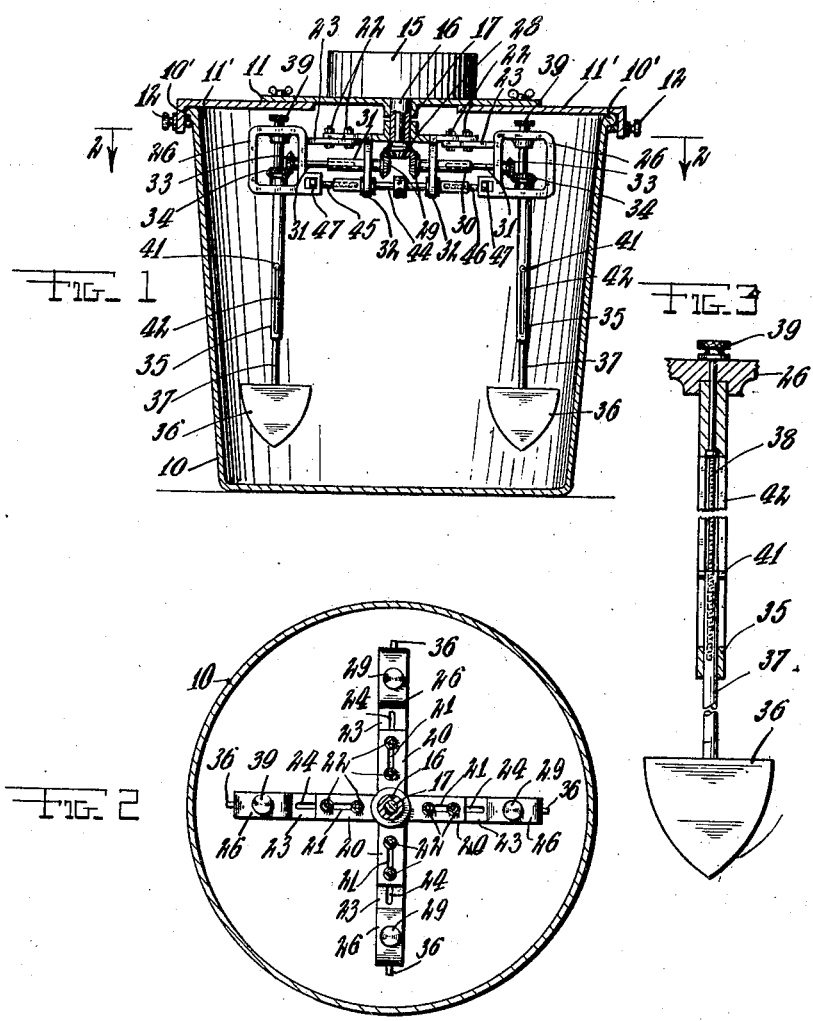
Inventor
Frank W. Conklin

Patented Jan. 1, 1924. 1,479,584

UNITED STATES PATENT OFFICE.

FRANK W. CONKLIN, OF BROOKLYN, NEW YORK.

BEATER AND MIXER.

Application filed May 9, 1923. Serial No. 637,922.

*To all whom it may concern:*

Be it known that I, FRANK W. CONKLIN, a citizen of the United States, residing at Brooklyn, in the county of Kings and State of New York, have invented certain new and useful Improvements in Beaters and Mixers, of which the following is a specification.

This invention relates generally to mixers or beaters which are used for mixing liquid or semi-liquid ingredients together in a vessel or for beating up materials such as cream or eggs.

The invention has for an object to provide a novel and improved device of this sort characterized by ready adjustability of the operating parts to suit varying conditions.

For further comprehension of the invention, and of the objects and advantages thereof, reference will be had to the following description and accompanying drawings, and to the appended claims in which the various novel features of the invention are more particularly set forth.

Fig. 1 of the drawings is an axial sectional view of my improved beater and mixer.

Fig. 2 is a horizontal sectional view thereof, taken on the line 2—2 of Fig. 1.

Fig. 3 is a detail axial sectional view of one of the beater shafts.

As here embodied my improved device comprises a bowl or other suitable receptacle 10 for the article or materials being operated on, this bowl being preferably of circular shape. Upon the top of the bowl a cover 11 is removably seated, and may be secured in place by means of set screws 12 threaded through the slidable extension 11′ of the cover and bearing against a downturned flange 10′ on the top edge of the bowl.

This cover has mounted on it a centrally positioned motor 15 of the ordinary clock type and which drives the two shafts 16 and 17 at relatively slow and fast speeds, the shaft 16 being hollow and enclosing the shaft 17. I have not considered it necessary to illustrate the details of the motor mechanism, since the latter is of the usual clock type which drives a pair of shafts relatively at different speeds.

These shafts 16, 17 pass from the motor downward through the cover 11 and the hollow shaft 16 has fixed to its lower end, just below the cover a member 20 which has a number of radially projecting arms and which I will refer to as the spider. The arms of this spider are longitudinally slotted as at 21 to receive bolts 22 which secure to said arms the extensions 23 serving to support the beater shafts. These extensions being formed with longitudinal slots 24 through which the bolts 22 also pass. On the ends of these extensions 23 are open frame elements 26 which support the beater shafts to which reference will be presently made in detail. As will be apparent, the spider 20 and with it the members 26, will be caused to revolve at a relatively slow speed.

The inner shaft 17 leading from the motor has a bevel gear 28 fixed to its lower end and meshing with a number of like gears 29 formed on the inner ends of radially extending telescopic shafts comprising the two sections 30, 31 having a suitable feather connection one with the other. The shaft sections 30 are supported by bearing elements 32 depending from the spider 20, while the shaft sections 31 are supported by the frames 26, extending into the latter and having bevel gears 33 mounted on their outer ends. These bevel gears 33 mesh with like gears 34 on the beater shafts, which latter are shown at 35 and are supported in the frames 26 and extend downwardly therefrom and carry paddle shaped beaters 36.

In order to permit of ready adjustment of the beaters 36 in a vertical direction they are fixed on the lower ends of rods 37 which extend upward through the shafts 35, which are hollow, these rods having threaded sockets entered down from the upper ends thereof into which are threaded the lower ends of screws such as 38. These screws are adapted for rotation but are held against movement longitudinally of the shafts 35, and their upper ends project through the top elements of the frames 26 and have knobs or heads 39 thereon for turning purposes. Projecting laterally from the upper ends of each rod 37 are pins 41 which engage in longitudinal slots 42 in the surrounding shaft 35 and hold the rod against rotation with respect to the shaft.

To enable the extensions 23 to be adjusted evenly in unison along the arms of the spider 20 I have shown a turnbuckle sleeve 44 as rotatably mounted in the bearing elements 32 and engage at opposite ends by the respectively right and left hand screws 45 and 46 which have a swivel connection at their outer ends with the frames 26 as indicated at 47.

In Fig. 1 of the drawings I have indicated the spider as provided with only two diametrically opposed arms each supporting one beater, while in Fig. 2 I have shown the spider as formed with four evenly spaced arms, with a consequent provision of four beaters. It will be understood of course that where the four beaters are employed the adjusting device 44 will be omitted, the machine being otherwise the same.

It is to be understood that various other changes and modifications might be made in the detail construction of my improved beater and mixer without departing from the spirit and scope of the invention as defined in the appended claims.

Having thus described my invention what I claim as new and desire to protect by Letters Patent of the United States is as follows:

1. A device of the class described comprising a receptacle, a rotary spider therein, a vertical shaft on which said spider is fixed, radially extensible frame elements carried by said spider, radially extending shafts supported partly by said spider and partly by said frame elements, vertical beater shafts supported by said frame elements, gear connections between the said radially extending shafts and vertical beater shafts, a second shaft passing axially through the shaft on which the said spider is fixed, gear connections between said last named shaft and the said radially extending shafts, and a motor adapted to drive the first named and said last named shafts at relatively different speeds.

2. A device of the class described comprising a spider having longitudinally slotted arms, longitudinally slotted extensions on the said arms, bolts securing said extensions to said arms, vertical beater shafts carried by said arms, radial telescopic shafts for driving said beater shafts, and a turnbuckle element for moving said extensions inwardly or outwardly.

3. A device of the class described comprising a spider having longitudinally slotted arms, longitudinally slotted extensions on the said arms, bolts securing said extensions to said arms, vertical beater shafts carried by said arms, radial telescopic shafts for driving said beater shafts, and a turnbuckle element for moving said extensions inwardly or outwardly, beater elements on said beater shafts, and means for adjusting said beater elements along said beater shafts.

4. A device of the class described comprising a spider having longitudinally slotted arms, longitudinally slotted extensions on the said arms, bolts securing said extensions to said arms, vertical beater shafts carried by said arms, radial telescopic shafts for driving said beater shafts, and a turnbuckle element for moving said extensions inwardly or outwardly, beater elements on said beater shafts, and means for adjusting said beater elements along said beater shafts, comprising rods carrying said beater elements and extending axially into said beater shafts, and screws rotatable but not axially movable in said beater shafts and threaded into sockets in said rods.

In testimony whereof I have affixed my signature.

FRANK W. CONKLIN.